254-310 SR

OR RE 2,187

Sheet 1-3 Sheets.

J. Schaffer,

Capstan,

No. 2,187, Reissued Mar. 6, 1866.

Witnesses.
J. H. Grimes,
C. M. Cheney

Inventor
John Schaffer.
By his
Attorney James J. Johnston

J. Schaffer.
Sheet 2 - 3 Sheets
Capstan.
No. 2187
Reissued March 6, 1866
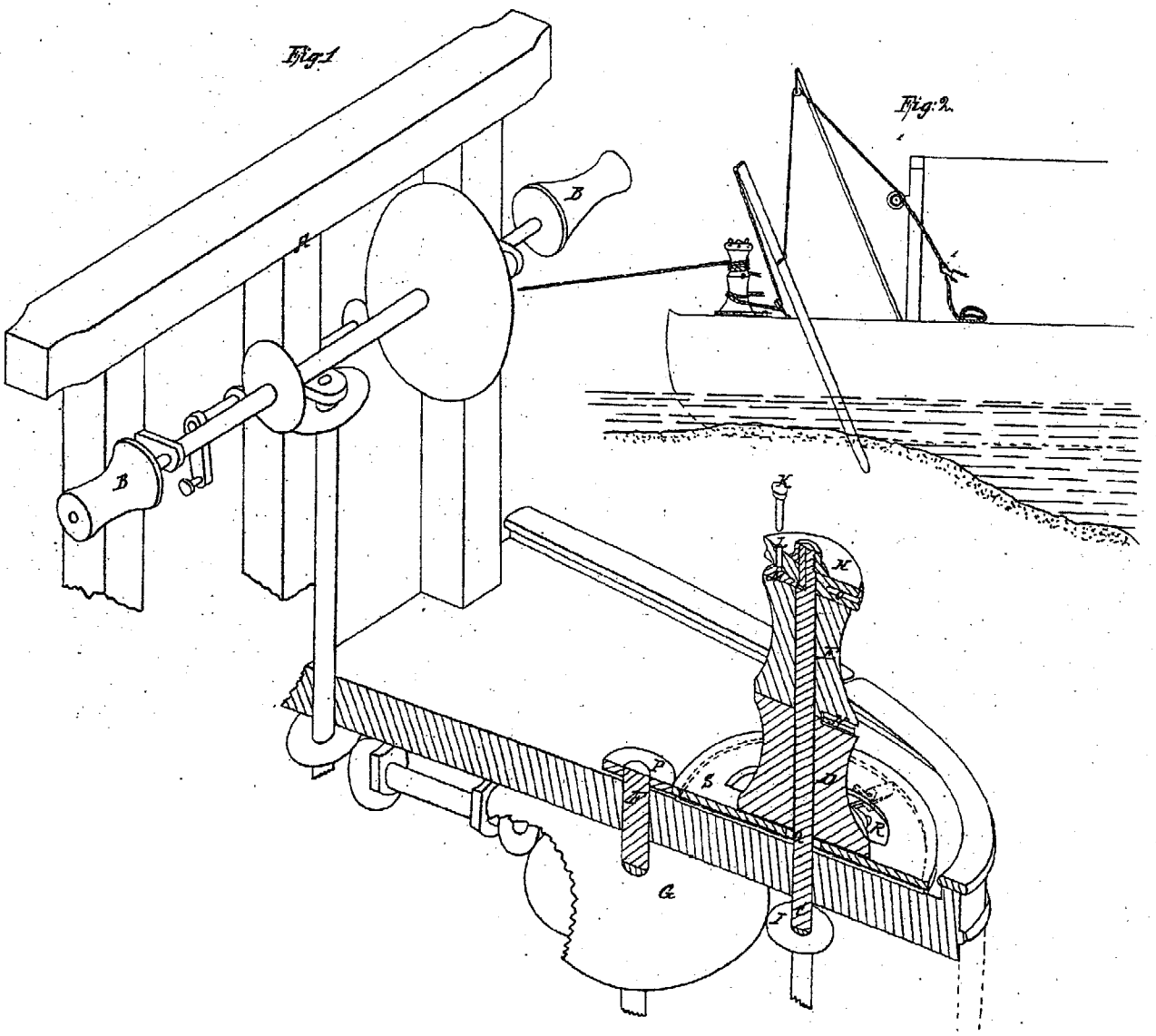

J. Schaffer,

Capstan,

No. 2,187, Reissued Mar. 6, 1866.

Witnesses.
J. H. Phillips
E. K. Swany

Inventor.
John Schaffer.
By his
Attorney Samuel Johnston

UNITED STATES PATENT OFFICE.

JOHN SCHAFFER, OF ST. LOUIS, MISSOURI.

IMPROVED STEAM-CAPSTAN.

Specification forming part of Letters Patent No. 16,935, dated March 31, 1857; Reissue No. 2,187, dated March 6, 1866.

*To all whom it may concern:*

Be it known that I, JOHN SCHAFFER, formerly of West Manchester, in the county of Allegheny and State of Pennsylvania, but now of St. Louis, in the State of Missouri, have invented a new and useful improvement in the mechanism involved in handling Western steamboats when aground, &c.—viz., in the capstan and hoisting-shaft; and I do hereby declare that the following is a full and exact description thereof, reference being had to the accompanying drawings, and to the letters of reference marked thereon.

My invention consists in operating the capstan of Western steamboats by connecting said capstan, by means of suitable gearing and shafting, to the "little nigger" engine, whether placed above or below deck; and my invention also consists in an extension of the shaft of the hoisting-drum and providing the extended parts of said shaft with coniformed drums, termed "winch-heads," the whole being constructed, arranged, and operating in the manner hereinafter described.

To enable others skilled in the art to make and use my invention, I will proceed to describe its construction and operation.

Figure 1:
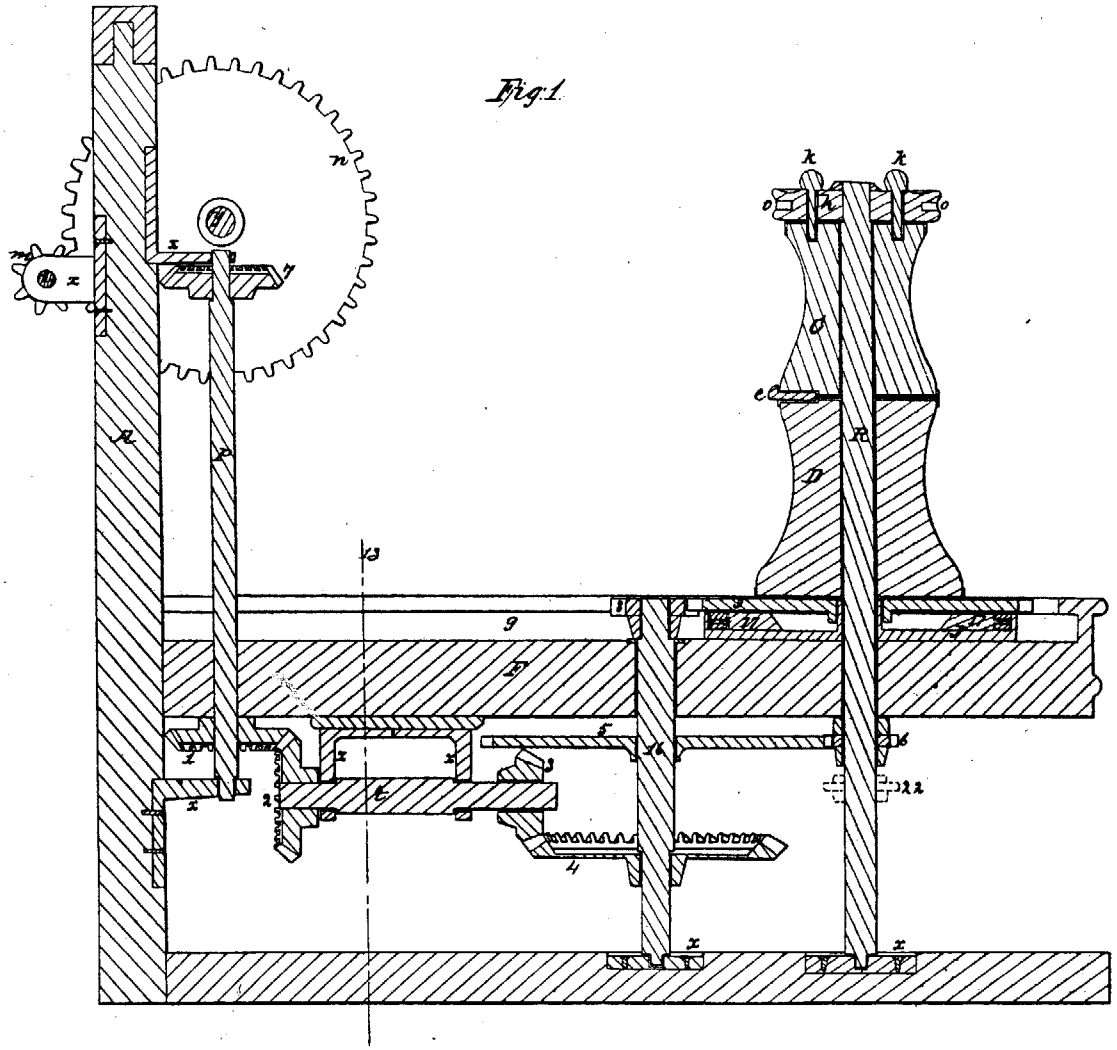
Figure 2:
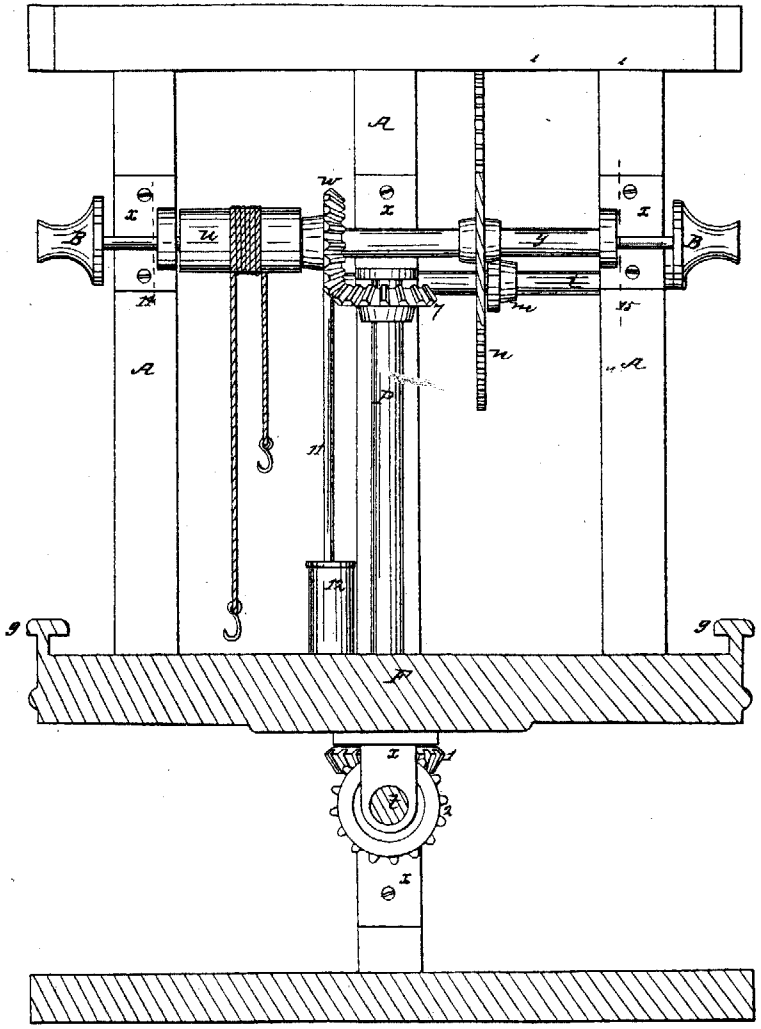

In the accompanying drawings. Figure 1, Sheet A, represents a longitudinal section of the front part of a Western steamboat, sufficient to show the parts sustaining the hoisting shaft and drum, the capstan, and the gearing connecting it with the little nigger engine. Fig. 2, Sheet B, represents a front elevation of the same when cut through at line marked 13, representing the arrangement of the hoisting shaft and drum, and the mode of connecting said shaft with the gear for operating the capstan. Fig. 3, Sheet C, represents a diagram of a boat on a shoal, and the capstan with "head-line" and "spar-line" operated at the same time, and illustrating also how the hoisting-shaft, with its extension and coniformed drums or winch-heads, are to be used in connection with a derrick for handling the spars—viz., when hoisting them up out of the place where they are stowed away, hoisting them up after being operated by the capstan, and any other handling of the spars or any of the lines used in handling the boat, all of which can readily be imagined and understood from the diagram represented by Fig. 3 on Sheet C.

In the drawings, A represents the gallows-frame, to which the shafts driven by the l nigger engine are usually attached. In Fig. 2, 12 represents the little nigger engine *f*. 11 represents the piston of the engine, and is attached to a crank on the shaft *i*, which is provided with a pinion, (marked *m*, which, in Fig. 2, is represented out of gear.) This pinion gears into the wheel marked *n*, placed on the hoisting-shaft *y*, which is provided with a hoisting-drum, *u*, which is used for hoisting freight out of and lowering it into the hold of the vessel. Prior to the date of my invention this hoisting-shaft *y*, provided with a drum or drums, *u*, was used exclusively in connection with the little nigger engine for handling freight in the manner described.

Now, one of the most laborious and at the same time most dangerous parts of the work in handling the boat is the hoisting of spars, operating the capstan, and manipulating the lines. To avoid the danger and lessen the labor of hoisting the spars, operating the capstan, and for the more effective working of the sparring-lines and the head-lines of the boat, I have divided the capstan-drum into two parts and placed them on one shaft, and by means of suitable gearing and shafting have connected said capstan and its shaft with the little nigger engine whether said engine is placed above or below deck, and have extended the hoisting-shaft *y* beyond the dotted lines marked 14 and 15, and have provided said extended parts of the shaft with coniformed drums or winch-heads B, which, in connection with said extensions of the hoisting-shaft *y* and placing said shaft and its winch-heads upon the gallows-frame A, out of the passage-ways and clear of the deck and its hands, and the dividing of the capstan-drum into two parts, and connecting said capstan with the little nigger engine by gearing and shafting, for the purpose stated, is the main and marked feature of my invention.

On the hoisting-shaft *y* is placed a beveled wheel, (marked *w*,) which gears into a beveled wheel, 7, on the upper end of the shaft P, on the lower end of which is placed a beveled wheel, 1, which gears into a beveled wheel, 2, on the back end of shaft *t*, the front end of which is furnished with a beveled wheel, 3, which gears into a large beveled wheel, 4, on the shaft 16, which is also furnished with a large wheel, 5, which gears into a pinion (marked 6) on the capstan-shaft R, on the upper end of which is permanently secured the capstan-head *h*, which is provided with two pins (marked *k*) which are used for the purpose of securing the upper part, C, of the capstan-drum to the capstan-head *h*, so that it will revolve with the shaft R.

To the lower end of the part D of the capstan-drum is secured a wheel, (marked 9,) which gears into a pinion (marked 8) on the upper end of the shaft 16. The capstan and its wheel 9 rests on a circular plate, J, which is secured to the deck F of the boat. This circular plate is furnished with suitable stops, 17, for the pawl of the capstan, which pawl is secured to the lower end of the part D of the capstan in the usual manner, and acts against the stops 17 in the ordinary way, which is well understood.

In the upper end of the part D and in the lower end of the part C of the capstan are made recesses, in which is placed a key, *e*, for the purpose of causing the two parts of the capstan to revolve together when so desired.

The capstan-head is furnished with openings *o*, for hand-levers, which can be used for operating the capstan in the absence of steam.

*g* represents the guards of the deck F.

18 represents the head-line.

10 represents the spar.

19 represents the spar-line.

20 represents the hoisting-line.

21 represents the derrick.

*x* represents the bearings of the various shafts.

The operation of the various parts is as follows: The little nigger engine imparts motion to the shaft *i*, which will revolve the wheel *m*, which will revolve the wheel *n* and shaft *y*, which will revolve the drums *u* and B and the wheel *w*, which will revolve the wheel 7, which will revolve shaft P and wheel 1, which will revolve wheel 2, shaft *t*, and wheel 3, which will revolve wheel 4 and shaft 16, which will revolve the wheel 5, which will revolve the wheel 6 and capstan-shaft R, which will revolve the capstan-head *h*, which will revolve the parts C and D of the capstan-drum, when the pins *k* and key *e* are in place, as represented in Fig. 1, Sheet A.

When I desire a rapid motion of the shaft R with its capstan-drums, I remove the pinion 8, which will make the capstan dependent on the wheel 5 and pinion 6; but when I desire a slow motion of the capstan-drum, and great power, I unship the pinion 6 from wheel 5, as indicated by the dotted lines marked 22, and replace the pinion 8 on shaft 16. In this case motion is imparted to the capstan through the medium of shaft R, and in the other case through the medium of shaft 16.

When I desire to operate both the head-line 18 and spar line 19 at one and the same time, which is often required when the boat is "aground," I remove the key *e*, and operate the part D of the capstan through the medium of shaft 16 and the wheels 8 and 9, which motion of part D will operate the spar-line 19. I then operate the part C of the capstan by means of hand-levers.

It will readily be observed that by dividing the capstan-drum into two parts, and gearing it in the manner described, a great variety of combined action of the spar-lines and head-lines can be obtained. The advantages growing out of such combination of action in a capstan for Western steamboats will be very apparent to all who are acquainted with the difficulties of navigating the shallow and shoaly parts of the Western rivers of the United States.

The hoisting of the spars by the coniformed drums or winch-heads B is performed by making two or three turns of the derrick-line 20 around the winch-heads B, and the revolving of it will hoist or lower the spar to the place desired.

By the use of the winch-heads B, placed on the ordinary hoisting-shaft, a very great amount of hard, laborious, and dangerous work is saved, and the deck-hands, who ordinarily do this work, are free to perform other labor required of them on the boat.

Having thus described and represented my improvement in capstans, I wish it understood that I do not claim a capstan with a barrel divided into two or more drums rotated upon a stationary shaft; but

What I do claim is—

1. A capstan with the drum divided into two parts, the shaft R of which rotates within the drums C and D, which can be rotated separately or combined, with and by or independently of said shaft, and operated substantially in the manner and by the means herein described, and for the purpose set forth.

2. The use of the winch-heads B, when used in combination with the extension of the hoisting-shaft *y*, placed on the gallows-frame A, as herein described, and for the purpose set forth.

JOHN SCHAFFER.

Witnesses:

JAMES J. JOHNSTON,

ALEXANDER HAYS.